United States Patent [19]
Mark et al.

[11] Patent Number: 5,684,589
[45] Date of Patent: Nov. 4, 1997

[54] LOOP CONTROLLER FOR FIBER OPTIC GYRO WITH DISTRIBUTED DATA PROCESSING

[75] Inventors: John G. Mark, Pasadena; Daniel A. Tazartes, West Hills; David I. Tazartes, Beverly Hills, all of Calif.

[73] Assignee: Litton Systems, Inc., Woodland Hills, Calif.

[21] Appl. No.: 520,217

[22] Filed: Aug. 28, 1995

[51] Int. Cl.$^6$ ................................................. G01B 9/02
[52] U.S. Cl. ................................................. 356/350
[58] Field of Search ........................... 356/350; 364/565

[56] References Cited

U.S. PATENT DOCUMENTS

| 5,337,143 | 8/1994 | Mark et al. | 356/350 |
| 5,351,123 | 9/1994 | Spahlinger | 356/350 |

*Primary Examiner*—Samuel A. Turner
*Attorney, Agent, or Firm*—Elliott N. Kramsky

[57] ABSTRACT

A loop controller for a fiber optic gyroscope employs distributed data processing to compress numerous additional useful functions into each loop transit time. The architecture of the loop controller includes a field programmable gate array for generating variables of varying sign. In addition, the array acts to buffer the transmission of parameters between the gyro processor and an auxiliary processor. The auxiliary processor updates such parameters (which do not require updating every loop transit time) and a number of such parameters are multiplied by values generated by the array in operations performed by the gyro processor that replace what would otherwise require throughput intensive test and branch operations. The combination of the off-loading of selected variable and parameter generation and updating with programming of the gyro processor for parallel processing permits the loop controller to perform numerous useful operations not previously possible during a realistic loop transit time.

28 Claims, 4 Drawing Sheets

LOOP CONTROLLER FOR FIBER OPTIC GYRO WITH DISTRIBUTED DATA PROCESSING

BACKGROUND

1. Field of the Invention

The present invention relates to a method and apparatus for obtaining rotation rate information by means of a fiber optic gyroscope. More particularly, this invention pertains to a method and associated apparatus for controlling a gyro by means of microprocessor.

2. Description of the Prior Art

The Sagnac interferometer is an instrument for determining rotation by measurement of the non-reciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "non-reciprocal" perturbations affect the counterpropagating beams differently and according to the direction of propagation. Such non-reciprocal perturbations are occasioned by physical effects that disrupt the symmetry of the optical medium in which the two waves propagate. Two of the non-reciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of a ring gyroscope.

It is known that the fringe or interference pattern formed by the counterpropagating beams of a gyro consists of two elements, a d.c. component and a component that is related (e.g. cosine function) to the cause of the phase difference between the beams. This phase difference provides a measure of the non-reciprocal perturbation due, for example, to rotation. As a consequence of the shape of the fringe pattern, when small phase differences are to be measured (e.g. low rotation rates), the intensity of the combined beam is relatively insensitive to phase difference as such difference occurs close to the maximum of the phase fringe pattern. Further, mere intensity of the composite beam does not indicate the sense or direction of rotation.

For the foregoing reasons, an artificially biased phase difference is commonly superimposed upon the counterpropagating beams. The biasing of the phase shift, also known as "non-reciprocal null-shift," enhances the sensitivity of the intensity measurement to phase differences. A maximum degree of sensitivity is achieved by shifting the operating point of the gyroscope to ±π/2 (or odd multiples thereof). Furthermore, by alternating the bias between +π/2 and −π/2, two different operating points are observed. This enables the system to determine the sign of the phase difference and, thus, the direction of rotation.

In addition to phase modulation, the processing of an interferometer output commonly employs "phase nulling" that introduces an additional phase shift through a negative feedback mechanism to compensate for that due to the non-reciprocal (Sagnac) effect. Commonly, the negative feedback generates a phase ramp whose slope is proportional to the rate of rotation to be measured. In actual practice, a ramp whose height varies between 0 and π2radians is employed as the nulling phase shift cannot be increased indefinitely due to voltage constraints.

U.S. Pat. Ser. No. 4,705,399 of Graindorge et al. discloses a digitally-based arrangement that employs a "stairstep" waveform. The height of each step is equal to the measured phase difference while the width or period of each is the group delay time of the optical coil. On the average, the slope of the ramp is equivalent to the measured non-reciprocal phase difference per unit of time. This method is compatible with digital signal processing and enjoys many resulting advantages. The phase modulation may be directly added to the digital ramp through the synchronization offered by a digital signal processor. The (combined) signal ultimately controls the phase modulator that is positioned within the optical fiber coil.

The operation of a fiber optic gyroscope accordingly requires the performance of numerous functions, including the above-described modulations (and associated demodulations) on a continuing basis. That is, such actions must be performed generally at least as frequently as each loop transit time τ. In the event that additional functions are desired (for example, to increase gyro accuracy), such other functions may also require repetition of actions during each loop transit time.

U.S. Pat. No. 5,337,143 of John G. Mark and Daniel A. Tazartes entitled "Loop Controller For Multiplexed Triaxial Gyro" discloses an application specific integrated circuit ("ASIC") that functions as a loop controller for a triaxial gyro. The controller accepts the digitized outputs of three modulated gyros, measures the rotation associated with each, digitally processes the outputs and provides analog signals for driving the gyro phase modulators. The operations of the loop controller are directed by a microprocessor. As such, a certain degree of flexibility is attained in that various types of modulation (e.g. random, pseudo-random, orthogonal, deterministic) may be input from the microprocessor and the computational power of the microprocessor is available to update system parameters. The loop controller is not programmable in and of itself. As a result, it is limited by both the speed of the associated microprocessor and its own inflexibility. Accordingly, the loop controller is constrained in scope of operation, being essentially limited to the "basic" loop controller functions of gyro modulation, demodulation of rate information, generation of a phase-nulling ramp, outputting of the rate data employed for phase-nulling, resetting of the ramp. It is, of course absolutely essential that the gyro be capable of measuring angular rate and phase modulator scale factor control (to ensure linearity and accurate stairstep ramp rollovers of magnitude 2π). Other features, such as loop gain control (for wide bandwidth response) and offset control (to minimize noise), while not essential are extremely desirable capabilities as well.

While the ability of a microprocessor to perform numerous calculations within a short period of time suggests microprocessor-based loop controllers, the relatively-limited capacity of conventional microprocessors in relation to the throughput requirements of fiber optic gyro systems as described above mandates that the loop controller design carefully regulate microprocessor utilization. As a consequence, microprocessor-based loop controller designs have foregone the implementation of many useful system features and capabilities.

SUMMARY OF THE INVENTION

The present invention addresses the foregoing and other shortcomings of the prior art by providing, in a first aspect, a loop controller for receiving the output of a fiber optic gyro generated during a loop transit time τ and deriving a plurality of gyro functions in response. Such apparatus includes a gyro processor for receiving the output of the gyro. A field programmable gate array generates signed values during each loop transit time. An auxiliary processor updates predefined parameters and the gyro processor is arranged to receive the updated parameters and the signed values and to generate gyro functions in response.

In a second aspect, the invention provides apparatus for receiving the output of a fiber optic gyro generated during a loop transit time τ and deriving a plurality of gyro functions in response. Such apparatus includes means for receiving the gyro output. Means are provided for generating signed values during each loop transit time. Means are additionally provided for updating predefined parameters. The means for receiving is arranged to receive the updated parameters and the signed values and to generate the gyro functions in response.

In a third aspect, the invention provides a method for deriving a plurality of gyro functions during a loop transit time. The method is begun by receiving the output of the gyro. Thereafter, the output is processed by dividing the processing functions into (i) generating signed values during each loop transit time, (ii) generating and updating predefined parameters and then (iii) generating the gyro functions in response thereto.

In a fourth aspect, the invention provides a method for deriving a plurality of gyro functions during a gyro loop transit time. Such method is begun by receiving the output of the gyro. Thereafter, the output is processed within a loop controller. The loop controller is divided into (i) a gyro processor for receiving the gyro output, (ii) a field programmable gate array for generating signed values during each loop transit time, and (iii) an auxiliary processor for updating predefined parameters. The gyro processor is arranged to receive the updated parameters and the signed values and to generate the gyro functions in response.

The preceding and other features and advantages of this invention will become apparent from the detailed description that follows. Such written description is accompanied by a set of drawing figures. Numerals of the drawing figures, corresponding to those of the written description, point to the features of the invention, like numerals referring to like features throughout.

DETAILED DESCRIPTION OF THE PREFERRED EMBODIMENT

Figure 1:
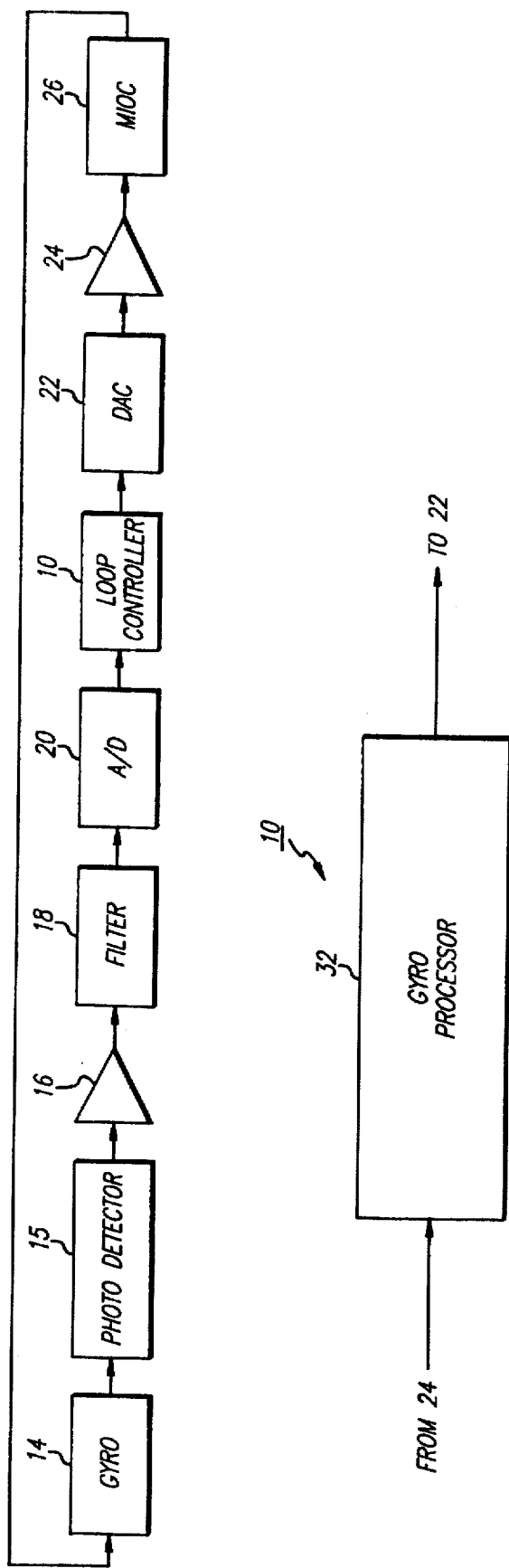
FIG. 1 is a schematic operational diagram of a single axis fiber optic gyro system incorporating a loop controller in accordance with the invention.

FIG. 1 is a schematic operational diagram of a single axis fiber optic gyro system that employs a loop controller 10 in accordance with the invention. The loop controller 10 is based upon a programmable microprocessor having parallel processing capabilities. As will be seen below, by efficiently arranging the processing of gyro data within the loop controller (including an auxiliary processor and a field programmable gate array), the system obtains greater flexibility than is realized by systems including controllers based exclusively upon hardwired or ASIC circuitry. Proper choice of the processor and careful software design ensures sufficient throughput. Thus, it will be shown that the loop controller 10 can perform sampling and loop closure within a single loop transit time τ while offering modulation and demodulation (both for rate and scale factor), loop perturbation and perturbation correction, gain error demodulation, reset to zeroeth fringe and full range (multi-fringe) scale factor demodulation and rate tracking, greatly enhancing the utility and accuracy of the associated gyro system.

A coherent light source (not shown) applies an output beam to a gyro 14 that includes a coil of optical fiber and an associated coupler (not shown) for dividing the output beam into a pair of beams that counterpropagated within the coil. The interferometric output beam from the gyro 14 is received by a photodetector 15 that converts the optical energy into a corresponding electrical signal. Optical phase modulation, discussed above, is applied to the beams counterpropagating within the fiber coil of the gyro 14 by means of an electro-optic phase modulator such as that present in a multifunction integrated optical chip (MIOC) 26. The phase modulation is generally formed by a specially doped LiNbO$_3$ waveguide subjected to an electric field.

The analog electrical signal output from the detector 15 is applied to a preamplifier 16 whose output is, in turn, applied to a filter 18. The output of the filter 18 drives an analog-to-digital converter 20 which digitizes the filtered analog signal to generate a waveform of digital data bits for application to the loop controller 10.

The loop controller 10 is arranged to accept the digital waveform output by the converter 20 and to generate, in response, both a measurement of rotation about the sensitive axis of the gyro 14 and a digital control signal (applied to the MIOC 26) for use in modulating and phase nulling the gyro 14 during the subsequent loop transit time τ. The digital output of the loop controller 10 is applied to a digital-to-analog converter 22 whose corresponding analog output is then applied to a driver 24, the output of which drives the MIOC 26.

I. Architecture of Loop Controller

Figure 2:
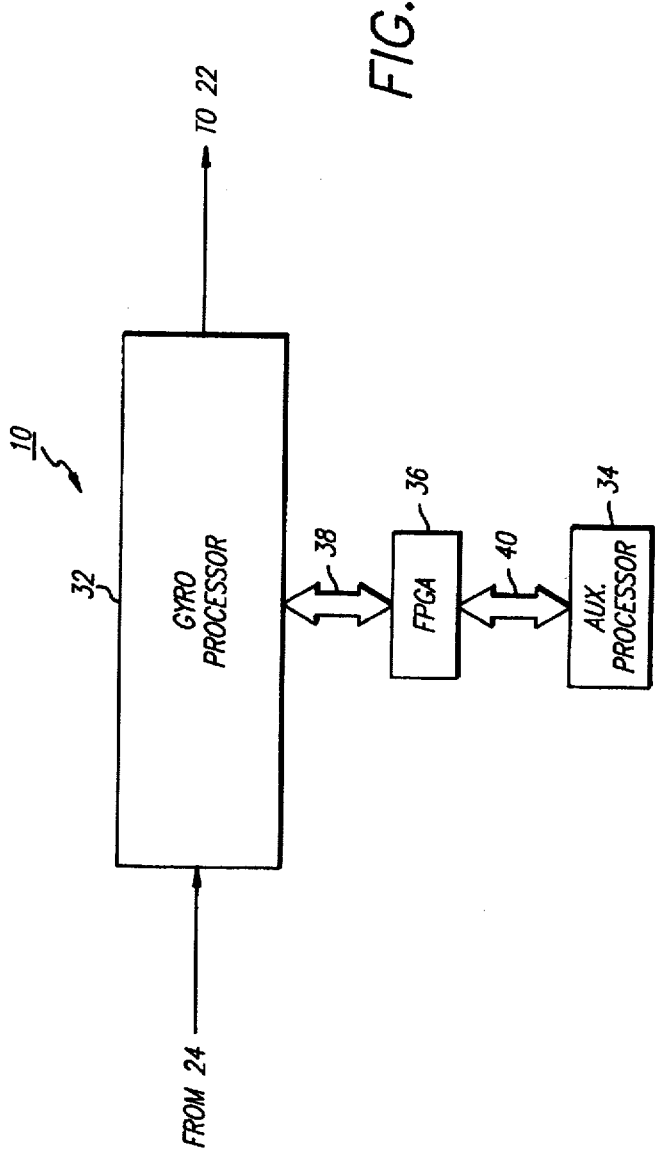
FIG. 2 is a block diagram of the loop controller of the invention that incorporates distributed data processing including the interactive arrangement of a gyro processor, a field programmable gate array (FPGA) and an auxiliary processor.

FIG. 2 is a block diagram for illustrating the cooperative arrangement of the functional elements of the loop controller 10. As mentioned earlier, the architecture of the controller 10 has been designed to take maximum advantage of the relevant capabilities of a gyro processor 32 capable of performing parallel instructions in a fiber optic gyro context. That is, the gyro processor 32 is configured, in conjunction with an associated auxiliary processor 34 (which processes only slowly varying parameters) and a field programmable gate array (FPGA) 36, to realize operational advantages not provided by hardwired loop controllers. The auxiliary processor 34 may comprise the system processor which performs many functions unrelated to gyro control. The system is arranged in accordance with the invention to be capable of completing the computations necessary to perform or direct numerous gyro functions within each loop transit time τ with flexibility beyond that possible employing present-day hardwired or ASIC systems.

The time budget of a gyro loop controller can be very demanding in terms of computational speed. For example, in a 1 km gyro with a loop transit time (τ) of about 5 microseconds. Assuming, for example, that the processor 32 is clocked at a 40 MHz rate leading to a 20 MHz instruction rate, about 100 instructions can be executed per transit time. For controlling three gyros in a conventional inertial navigation system, this leaves only 33 instructions per axis. In the present invention, by providing an efficient arrangement that includes the off-loading of certain computations (i.e. essentially those that needn't be completed each τ) to the auxiliary processor 34 and the generation of certain inputs by the FPGA 36 in combination with the careful design of the data processing architecture of the gyro processor 32 so that the algorithms therein do not violate rules of efficient operation, the numerous basic and "optional" control functions mentioned above can be accomplished within a single loop transit time τ. In fact, by employing the system architecture of the invention, the gyro processor 32 requires only 21 consecutive computational cycles to accomplish the functions discussed with reference to the flow chart of FIG. 5 below. Using a processor having a 40 MHz input clock and a 20 MHz instruction clock and capable of parallel instructions in accordance with the invention, this number of instructions may be executed within a little more than one (1) microsecond per gyro axis. Accordingly, for a three axis system essentially based upon the single-axis system of FIG. 1 with data multiplexed to permit sequential processing of the three axes, the computations required for the three orthogonal axes can be completed within the 3.5 microsecond time budget discussed and derived above.

Returning to FIG. 2, the elements of the loop controller are interconnected through two data busses. A first data bus 38 transmits various input parameters (discussed below) generated by the FPGA 36 to the gyro processor 32. The FPGA 36 also acts as a buffer, receiving inputs (discussed below) from the gyro processor 32 for transmission to the auxiliary processor 34 through a second data bus 40. In turn, the second data bus 40 receives updated parameters generated within the auxiliary processor 34. Such parameters are buffered within the FPGA 36 and then transmitted to the gyro processor 32 through the first bus 38. The auxiliary processor 34 may comprise the system processor and thus need not be dedicated exclusively to the control of the fiber optic gyro in contrast to the processor 32.

The FPGA comprises a programmable integrated chip whose logic design will be described below. The auxiliary processor 34 preferably comprises a known microprocessor such as a TMS 320C26 that is commercially available from Texas Instruments Corp. of Dallas, Tex. In the arrangement of the loop controller 10 as shown in FIG. 2, the auxiliary processor 34 is employed to provide data (including gyro parameters) that require updating at a rate of no greater than 2 kHz. This is to be contrasted with the 40 MHz clock of the gyro processor 32 and the approximate time budget of 5 microseconds per τ for a 1 km gyro. While the preceding numerical examples are representative of actual operational and design requirements, it will be appreciated that they are provided for illustration only. It will become apparent that alternative allocations of functions among the elements of the loop controller 10 may be made as the computational time budget of a gyro system is varied in accordance with variations in the loop transit time τ (due, for example, to a change in the length of the gyro fiber coil) and the addition or deletion of optional gyro control functions.

The gyro processor 32, discussed in detail below, is arranged or programmed for efficient operation to thereby enhance the number of gyro functions that can be performed during each loop transit time. The efficiency of the processor 32 is based in large measure upon the elimination of all so-called test and branch instructions. It is well understood in the art that the functions and architecture of a loop controller inherently include numerous "select" decisions that lend themselves to test and branch instructions. See, for example U.S. Pat. No. 5,337,143. Such instructions create logic branches that clog or tie up the pipeline of a processor. This follows from the fact that, until the "execute" cycle of such an instruction is completed, the relevant address in memory is unknown. This prevents the simultaneous execution of portions of other instructions during the cycles devoted to a test and branch instruction. A processor pipeline commonly contains a number of instructions that have yet to be executed. Upon encountering a branch, the pipeline must be re-loaded with the appropriate program. When this occurs, the initial content is lost and a delay is caused in processing. In effect, each test and branch instruction forces the processor to execute in a serial fashion. The architecture of the present invention, including the gyro processor 32, the auxiliary processor 34 and the FPGA 36, allows one to substitute an equivalent instruction, multiplication of a parameter by +1 or −1, that allows pipeline "sharing" with other instructions.

As will be seen, through careful design of the distributed architecture of the loop controller 10, eleven (11) of the twenty-one (21) instructions executed (per axis) per transit time τ by the gyro processor 32 may be performed "in parallel". Accordingly a total of thirty-two (32) operations may be performed per axis during each loop transit time. (Note: Eleven (11) computation cycles of simultaneous operations each yields twenty-two (22) operations. Adding another ten (10) cycles of single operations totals thirty-two (32) operations.) The combination of design employing multiplication to avoid test and branch conditions and the use of parallel instructions greatly reduces the number of instruction cycles required. For example, the number of cycles required to perform the primary rate loop alone without the benefit of the aforementioned techniques would be eighteen (18) to twenty-two (22). The scale factor loop would require an additional ten (10) to eleven (11) operations. As will be seen, the execution of each of such loops by the gyro processor 32 incorporates the substitution of a multiplication operation for a logical test and branch making it possible to run both of these essential functions on all three axes each transit time. This allows execution of both of these functions and, in addition, other useful functions such as a d.c. offset and a gain control loop while consuming fewer computation cycles than are normally required for the rate loop alone.

All three elements of the distributed loop controller 10 architecture are required to accomplish the above-described efficiency of the gyro processor 32 design. As mentioned, multiplication of parameters by ±1 in the processor 32 provides functions equivalent to computationally-wasteful "select" or "test and branch" operations. The FPGA 36 generates the various streams of thirty-two bit digital word representations of ±1 values (and, in the case of the modulation input signal, ±π values) that permit substitution of multiplications for select operations in the gyro processor 32. As the discussion proceeds, reference will occasionally be made to acronyms for and abbreviations of descriptions of the information content of various signals. When such acronyms and abbreviations are set forth in bold letters they will be understood to represent the encoding of such information into thirty-two bit words for processing by the gyro processor 32 and by the auxiliary processor 34.

II. Field—Programmable Gate Array (FPGA)

Figure 3:
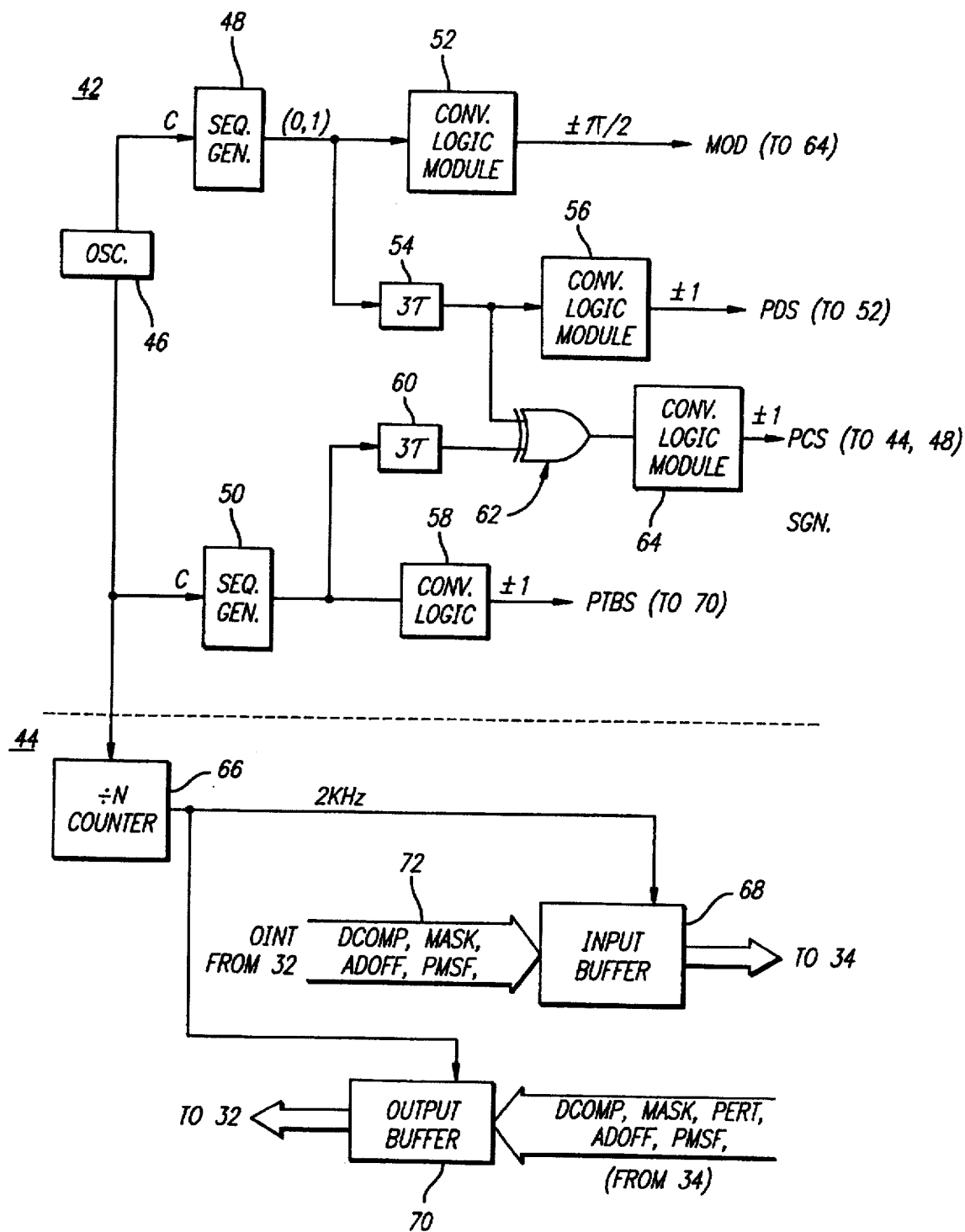
FIG. 3 is a schematic diagram of the FPGA of the loop controller.

FIG. 3 is a schematic diagram of the FPGA 36 which, as shown, is generally partitioned into a logic section 42 for generating the variables that must be supplied to the processor 32 anew each loop transit time τ while a buffer section 44 provides the necessary communication between the gyro processor 32 and the auxiliary processor 34 for operation within the auxiliary processor whereby various so-called "slow" parameters (i.e. parameters whose values are not adjusted every τ) are updated. It will be seen that the variables generated in the FPGA 36 and the parameters updated in the auxiliary processor 34 are interrelated insofar as some of these variables and parameters are multiplied within the gyro processor 32 to replace test and branch operations. Accordingly, it is the distributed architecture of the loop controller 10 that results in the capability of the gyro processor 32 to take advantage of the computational efficiencies described above.

II.A. Logic Section of FPGA

Referring to the logic section 42 of the FPGA 36, an oscillator 46 clocks sequence generators 48 and 50. Each of the sequence generators 48 and 50 provides a stream comprising a sequence of "high" and "low" voltage levels with each discrete level being output from a sequence generator upon arrival of a clock pulse from the oscillator 46.

The sequence generator 48 may store either a deterministic or a random sequence in accordance with the chosen type of modulation, whether deterministic, random or pseudo-random. The output of the sequence generator 48 is applied to a converter logic module 52 which transforms the received values and converts them in a one-to-one mapping into corresponding digital representations of ±π/2. The digital words representing values of ±π/2 are input, as a modulation signal MOD, to the gyro processor 32. The relationship of the MOD input to the computational pipeline of the gyro processor 32 will become apparent from FIG. 4, chart of the computational sequence of operations of the gyro processor 32. The computational "streamlining" of the functions of the gyro processor 32 will become apparent through continual reference to the chart of FIG. 4 as the discussion of the generation and updating of "off-loaded" variables and parameters proceeds.

Returning to FIG. 3, the output of the sequence generator 48 is also applied to a 3τ delay 54. This effectively delays the output of the sequence generator 48 to the time when the data received from the gyro via the analog-to-digital converter 20 corresponds to the application of the "MOD" signal. This delay is due to computation and analog-to-digital converter 20 and digital-to-analog converter 22 conversion times. The delay of 3τ is discussed for a particular hardware configuration although other delays are possible. The delayed output from the sequence generator 48 is applied to a converter logic module 56. The converter logic module 56 is arranged to map the stream of high and low voltage levels from the sequence generator 48 to a corresponding series of words comprising thirty-two bit representations of ±1. Referring to the FPGA 36, such series of ±1 values is related to the digital words representing ±π/2

(MOD) input during a prior loop transit time and define a primary demodulation sign ("PDS").

The second sequence generator 50 provides another sequence (deterministic, random or pseudo-random) of low and high voltage values that is applied to a converter logic module 58 whence this sequence of values is mapped into a corresponding series of thirty-two bit word representations of ±1. The output of the generator 50, a signal PTBS ("perturbation sign"), is employed to apply a perturbation to the gyro loop. As will be seen, such perturbation is employed to measure, and adjust, the loop gain (see AGC signal, below). The PTBS signal, digital words representing ±1, is later multiplied by a parameter, discussed below, within the pipeline of the gyro processor 32 to transform a test and branch operation into one suitable for parallel processing.

The output of the sequence generator 50 is applied to a delay 60. The delayed outputs of the sequence generators 48 and 50 are then combined in an exclusive-OR gate 62 and the output of such gate is then applied to a converter logic module 64 that converts the resulting stream of low and high values from the exclusive-OR gate 62 into a corresponding stream of thirty-two bit words representative of ±1 for application, as a perturbation correction sign signal ("PCS"), to the gyro processor 32. The PCS signal is employed to strip the errors due to loop perturbation imposed during a prior loop transit from the resultant gyro output signal. Again, as in the case of the PTBS signal, the PCS signal is multiplied by a perturbation compensation parameter ("DCOMP"), discussed below, to substitute a multiplication step suitable for parallel processing for a test and branch.

The FPGA 36 performs functions that are unreasonably difficult for a processor to perform but very easy for electronics. Because electronics often deals with single bits, the generation of random bits and their conversion to ±1 or ±2$^{30}$ (corresponding to ±π/2) is a simple task. The storage (for delay) and multiplication of single bits is likewise trivial. By contrast, a processor can in general only deal with thirty-two (32) bit words at a time. For it to perform operations on single bits requires a number of tricky and involved operations. The generation of two (2) random bits would consume ten (10) computation cycles if performed by the processor 32. Thirty (30) cycles would be consumed by a three (3) axis gyro. Delaying and converting the bits would consume another six (6) cycles of the gyro processor 32 per axis. This amounts to another eighteen (18) cycles per the three gyro axes. Accordingly, by freeing the pipeline of the gyro processor 32 from these tasks, a total of forty-eight processor computation cycles can be conserved. When performed by the FPGA 36, the necessary operations may be accomplished within 100 ns, the equivalent of two (2) computation cycles of the gyro processor 32.

II.B. Buffer Section of FPGA, Auxiliary Processor

Referring now to the buffer section 44 of the FPGA 36, a divide-by-N counter 66 receives the output of the oscillator 40 and divides it down to provide a synchronized 2 kHz signal that clocks both an input buffer 68 and an output buffer 70 of the buffer section 44. The buffers 68 and 70 serve to transmit various "slow" parameters (i.e. parameters that do not require updating every transit time τ) between the gyro processor 32 and the auxiliary processor 34. The significance of each of the various parameters that is computed and updated by the auxiliary processor 34 will become apparent from the discussion of the functions performed by the gyro processor 32 that follows. Reference may also be made to the chart of computational operations of the gyro processor 32, below, for an illustration of how the distribution of processing within the loop controller 10 permits the parallel operations that increase the capabilities of the loop controller 10.

The input buffer 68 receives and transmits to the auxiliary processor 34 while the output buffer 70 receives and transmits initial or updated values and transmits to the gyro processor 32 thirty-two bit digital words representing values of the following parameters:

| Digital Word | Function of Parameter |
| --- | --- |
| 1. PERT | Perturbation input for observing analog gain of loop; |
| 2. DCOMP | Value to compensate effect of perturbation input to loop; |
| 3. ADOFF | D.C. offset of output received from gyro; |
| 4. OINT | A value derived by gyro processor to calc. ADOFF error; |
| 5. PMSF | ("Phase Modulator Scale Factor") Value the digital-to-analog converter converts to a phase of $2\pi$ for driving the phase modulator; |
| 6. SINT | A value derived by gyro processor for calculating PMSF error; |
| 7. AGC | Value derived by gyro processor to calculate analog gain error; |
| 8. $\Delta\theta$ | Value of angle through which gyro has rotated during $\tau$; |
| 9. MASK | Value that determines whether the primary integrator is reset to zero. |
| 10. PINT | Value of primary integrator which corresponds to current angular rate. |

The auxiliary processor 34 employs parameters "4" and "6" listed above to determine parameters "3" and "5". A number of parameters, such as "1" and "9" do not require updating. The PMSF value is determined and adjusted by the auxiliary processor 34 in response to the scale factor error value SINT. The various relationships employed for updating the parameters by means of the auxiliary processor 34 rely upon well understood physical principles that are known to and understood by those skilled in the art.

III. Gyro Processor Pipeline

Figures 4A, 4B:
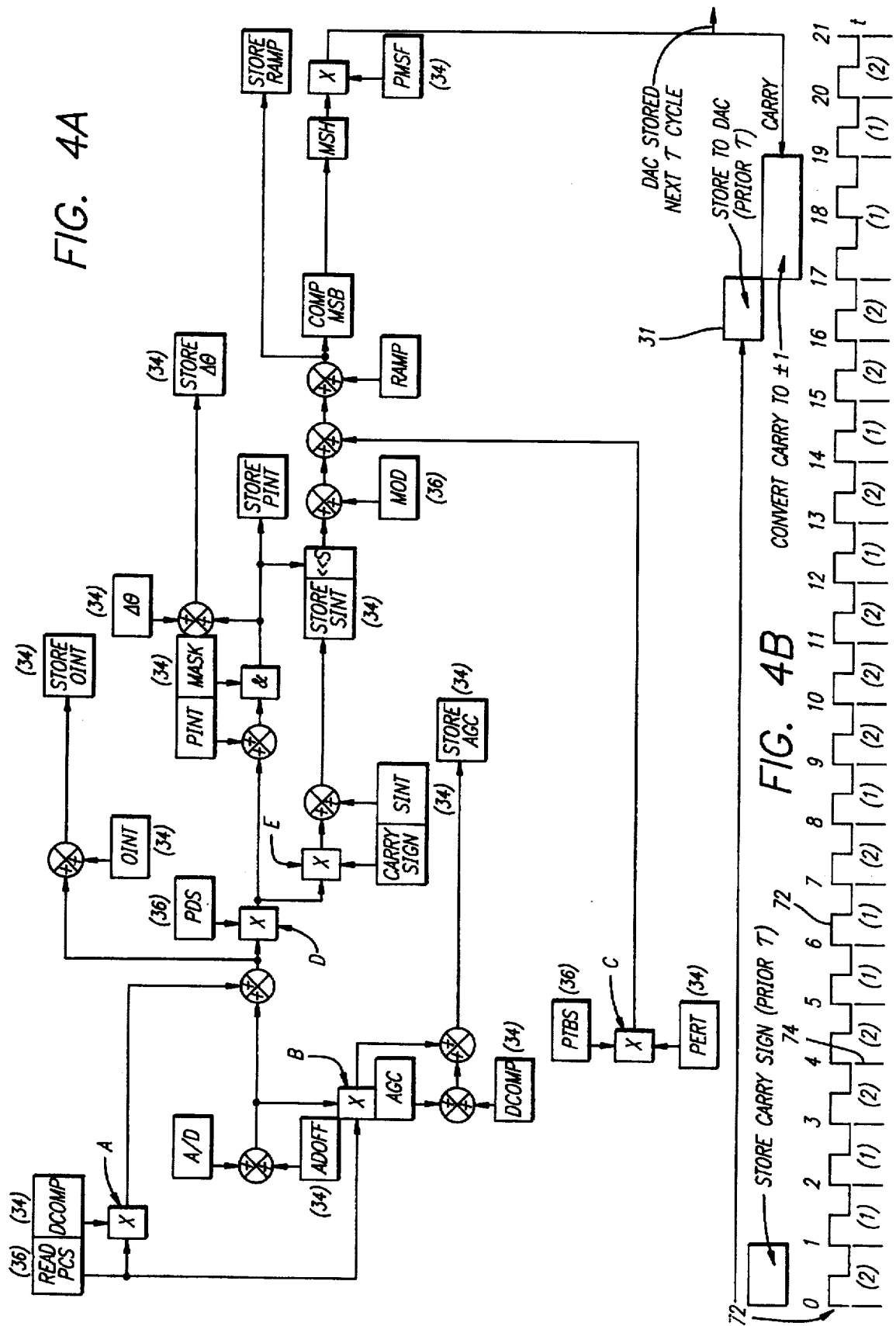
FIGS. 4(a) and 4(b) are a chart of the computational operations that occur within the gyro processor during a loop transit time and the corresponding sequence of clock timing pulses respectively.

FIG. 4(a) is a chart of the programmed sequence of computational operations for performing the functions of the gyro processor 32 while the waveform 72 of FIG. 4(b) illustrates the internal clock of the gyro processor 32. By aligning the computational sequence of FIG. 4(a) with the clock of FIG. 4(b), one can see that a total of twenty-one (21) computational cycles is required per axis during each loop transit. (A full discussion of the operations of the gyro processor that are accomplished through the computational sequence of FIG. 4(b) will be presented with reference to FIG. 5, below.)

The performance of all gyro processor functions for a three axis gyro, including a number of "optional" functions, within a single feasible loop transit time $\tau$ relies upon the ability to perform parallel operations within the gyro processor 32. This is accomplished through the combination of distributed processing operations and the elimination of computationally-wasteful functions. This, of course, refers to the substitution of a multiplication operation for each test and branch function otherwise called for in the required gyro computations. As mentioned above, a multiplication function may be performed in parallel with other operations, eliminating "clogging" of the pipeline of the gyro processor 32.

The distribution of data processing and the elimination of test and branch functions may be observed from the chart of computations of FIG. 4(a). The "off-loading" or distribution of computations is indicated on this figure by the association of variables employed by the gyro processor 32 with their origins. Thus, a "34" in parentheses next to a variable (e.g. "DCOMP") indicates that the variable has been updated in the auxiliary processor 34 rather than by the gyro processor 32 while a "36" in parentheses next to a variable (e.g. "PTBS") indicates that the variable has been generated within the field programmable gate array 36. The elimination of test and branch routines through substitution of a multiplication operation is indicated by letters "A" through "E". In each of these cases, a costly test and branch has been eliminated from the burden of the computational pipeline of the gyro processor 32.

The series of numbers in parentheses beneath the waveform 72 indicates the number of operations performed during each computational cycle of the gyro processor 32. As can be seen, two (parallel) operations are performed during the first, fourth, fifth, eighth, tenth through twelfth, fourteenth, sixteenth, seventeenth and twenty-first cycles. Otherwise a single operation is performed during each computational cycle, yielding a total of thirty-two (32) operations per loop transit time $\tau$ per gyro axis. It should be noted that one operation of the gyro processor 32 (conversion of CARRY to ±1) requires two computational cycles to complete.

Viewing FIG. 4(a), one can appreciate that the pipeline of the gyro processor 32 is freed of numerous computations through the distribution of computational tasks among the FPGA 36 and the auxiliary processor 34. (Some of the values provided by the FPGA 36 and the auxiliary processor 34 are stored in the internal memory of the gyro processor 32 while others are not. This accounts for the fact that a "READ" operation is required to input some values and not others.)

IV. Functions of Gyro Processor

Figure 5:
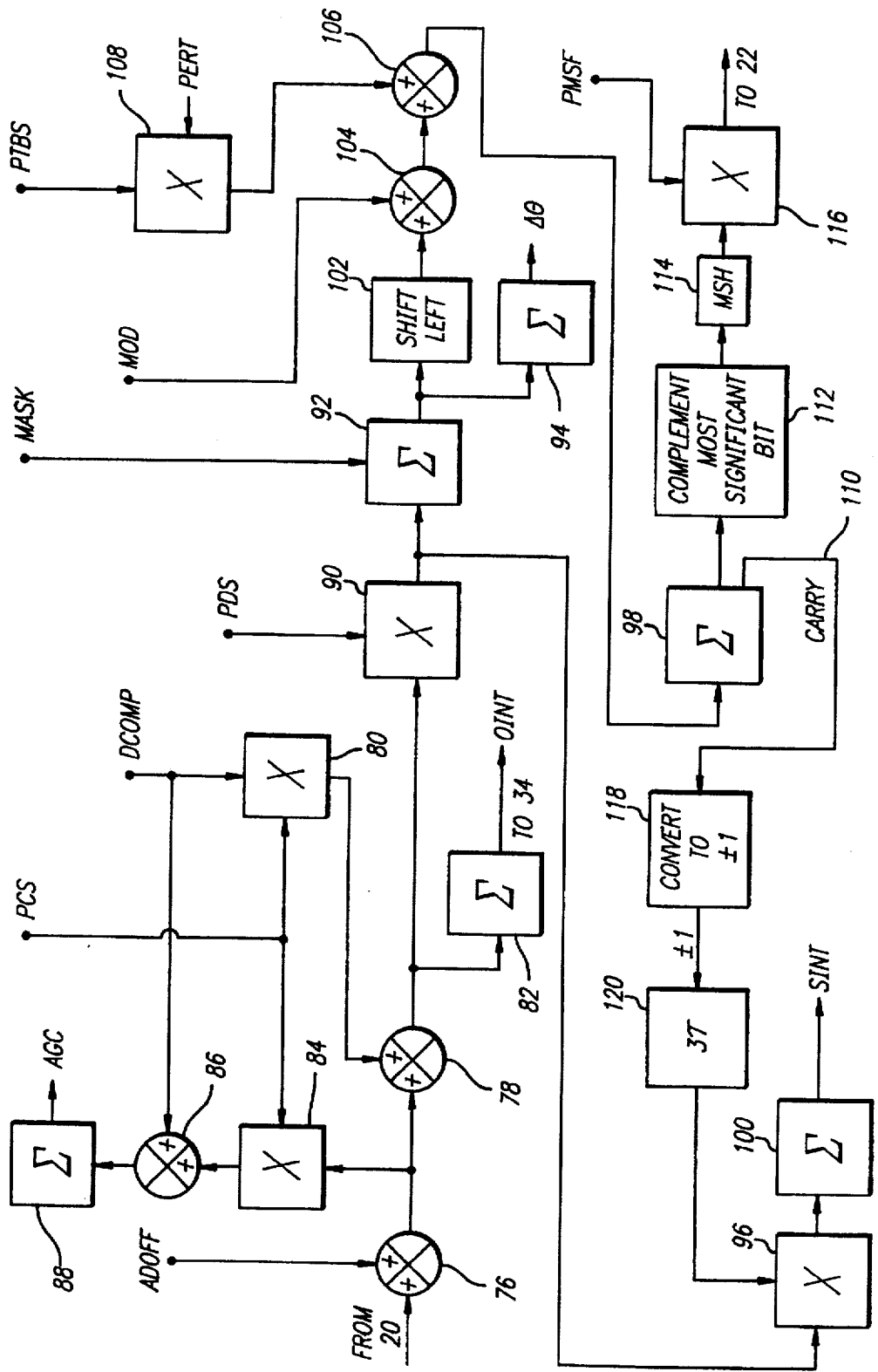
FIG. 5 is a diagram for illustrating the functions performed by the gyro processor within each loop transit time.

FIG. 5 is a diagram for illustrating the functions of the gyro processor 32. As mentioned earlier, the processor 32 may comprise, for example, a 32-bit TMS 320C30 or 320C31, each a 32 bit digital signal processor that is commercially available from Texas Instruments Corp. of Dallas, Tex. It will be appreciated from the description that follows that the gyro processor 32 offers numerous advantageous functions that have not been found in prior loop controllers. This follows from the distribution of operations as described above. Such distribution facilitates the "compression" of computations of the gyro processor 32 into a total of twenty-one cycles. Such compression affords the capability of performing each of the functions described below during each loop transit time $\tau$.

The operations described below presume, unless otherwise mentioned, data consisting of thirty-two bit words. However, the gyro processor 32 may readily be adapted to other bit lengths. It is noted as a general rule that decreasing the word length adversely affects precision. Conversely, increasing word length may, in some instances, improve precision. Also, throughout the discussion that follows, reference may be made to the preceding figures, FIGS. 3 and 4, to relate the variables and parameters processed by the FPGA 36 and the auxiliary processor 34 to the functions performed by the gyro processor 32. Through reference to FIG. 4, the various functions of the gyro processor 32 may be related to the processor pipeline. This will afford an appreciation of the manner in which the multiple functions of the gyro processor 32 are readily compressed within each loop transit time τ.

IV.A. Offset Correction

The gyro processor 32 receives, as input, a digital word representing the intensity of the output of the gyro 14, from the analog-to-digital converter 20 during each loop transit time τ. This value is corrected for d.c. offset or error (ADOFF) resulting from processing by the analog-to-digital converter 20 at 76. As mentioned earlier, the d.c. offset value is computed in and downloaded from the auxiliary processor 34 after buffering through the FPGA 36. The auxiliary processor 34 periodically updates the d.c. offset value in response to variations in the value of a variable ("OINT") that is computed within the pipeline of the gyro processor 32, discussed below.

IV.B. Perturbation Correction and Gain Error Detection

The output of the gyro 14, corrected for d.c. offset, is then applied to 78 where it is corrected for a nominal dither or perturbation value ±d that was injected during a prior transit time. The perturbation correction value applied at 78 is generated by multiplying the constant perturbation value, DCOMP, which, as mentioned earlier, is downloaded from the auxiliary processor 34 at initialization, by +1 or −1 at 80. The ±1 value represents the perturbation correction sign PCS generated by the FPGA 36 and derived from the perturbation or dither applied three transit times (t−3τ) prior (PERT). The sign is chosen from a predetermined, pseudo-random or random sequence which determines the polarity of the perturbation (PTBS) applied to the gyro for the purpose of measuring loop gain. As discussed in relation to the FPGA 36, the perturbation correction sign PCS is a delayed version of the perturbation sign PTBS times the delayed modulation sign (MOD). The perturbation correction sign (PCS) and perturbation correction value (DCOMP) are multiplied at 80 prior to summing at 78. The multiplication 80 supplants the need for a test and branch at this point of the pipeline of the gyro processor 32. (It may be noted that this operation occurs during computation cycle "3". See FIG. 4.)

Returning to FIG. 5, the output of the gyro 14, having been corrected for d.c. offset and for perturbation, is applied to 82 where a sum is taken to generate OINT, the offset error integrator, an average of the perturbation corrected values. The integration operation takes place during gyro processor 36 computation cycle "7" and the resultant value is passed through the FPGA 36 for computing ADOFF within the auxiliary processor 34. It should be noted that a parallel operation involving an internally-generated CARRY function takes place during this cycle.

The offset compensated gyro output derived at 76 is multiplied at 84 by the perturbation correction sign PCS to demodulate the perturbation signal. The perturbation compensation value DCOMP is added to the result at 86 to form a net error term. The net error is integrated at 88 to derive the gain error signal AGC. In the event that the perturbation compensation DCOMP has "nulled" the perturbation component of the input signal, the output of the integration 88 will be constant. Otherwise, the presence of an additional or residual amount of uncompensated perturbation will indicate the presence of a loop gain error. As mentioned earlier, AGC is applied to the auxiliary processor 34 through the FPGA 36 to adjust the gain of the preamplifier 16.

V.C. Angular Rate Detection

The dither and offset-compensated gyro signal is multiplied at 90 by the demodulation sign PDS generated within the FPGA 36. As mentioned earlier, PDS corresponds to a series of ±1's describing the prior modulation (MOD). The output of 90 represents the rate error. This is summed at the primary integrator 92 to generate an estimate of gyro rate. A MASK value from the FPGA 36, having a value of either "0" or "−1", provides optional clearing of the primary integrator 92 every τ and gives the loop controller 10 a fringe reset capability. If the gyro processor 32 were to command a zero MASK (i.e. a thirty-two bit word composed entirely of zeros), the primary integrator 92 would be subject to a bitwise AND function with the MASK signal yielding an output of zero regardless of initial value. Thus the MASK function permits clearing of the primary integrator 92 once initial transients have died out. On the other hand, the other possible MASK value is represented by thirty-two ones. In this case, the bitwise AND function will be transparent and the masked value of the integrator 92 will be identical to the initial value.

The output of the primary integrator 92 is integrated at 94 to produce Δθ, the change in angular position value. Δθ is applied to the auxiliary processor 34 through the FPGA 36 and is employed therein to generate various navigation parameters related to attitude change. In addition, the output of 90 is multiplied at 96 by a CARRY signal generated during a reset ramp integration 98 of a prior τ. The multiplication at 96 generates the scale factor error demodulation and this is integrated at 100 to provide an estimate of phase modulator scale factor error (a signal SINT).

The thirty-two bit word representing the rate value yielded by the integration 92 is then shifted left at 102, affecting or applying digital gain to the rate estimate value. (Each leftward shift results in an effective multiplication by 2. Because of finite word length the output of the shifter is limited in range. An inherent modulo $2^{32}$ operation results from the choice of a thirty-two bit operation. By setting a $2^{32}$ output of the shift left 102 to represent exactly $2\pi$, a modulo $2\pi$ phase control is built into the algorithm controlling the gyro processor 32. This limits the range of the voltage applied to the modulator to a $2\pi$ equivalent phase shift range. As a result, $2\pi$ "resets" known to those familiar in the art of closed loop fiber optic gyros occur naturally and automatically with no threshold testing.

IV.D. Rebalance and Modulation

The output of 102 provides a "rebalance" signal for maintaining the gyro at null in the presence of angular rate. This signal cancels out the Sagnac phase shift induced by angular rate. This output of 102 is summed at 104 with the modulation value MOD (corresponding to ±π/2) output each τ from the FPGA 36. The π/2 modulation value $2^{30}$ is employed in accordance with the $2^{32}$ representation of $2\pi$ as discussed. The sign of the modulation (incorporated into MOD) can change every τ. As described above, the values of MOD provided at 104 may be rendered of a deterministic, orthogonal, random or any other character in accordance with the sequence of signs of π/2 ($2^{30}$) values provided by the FPGA 36.

A perturbation or dither value is then added to the rate-plus-modulation at 106. The perturbation signal is generated by multiplying the perturbation value PERT by the perturbation sign PTBS at 108. As can be seen by reference to FIG. 4, this operation, which replaces a test and branch, takes place at computation cycle "4". A second, parallel operation can be seen to be executed during this same cycle.

The output of 106, representing rate-plus-modulation-plus-perturbation, completes the feedback and modulation. The rate-plus-modulation-plus-perturbation value is integrated at 98 to close the loop. The integration at 98 generates a digital step ramp plus a CARRY signal (generated whenever the addition operation results in toggling of the 33rd bit) that is output at 110. As mentioned earlier, CARRY, in combination with the rate error value determined at 90, is employed to determine the scale factor error SINT. The two factors, in combination, distinguish ±π/2 modulation from ±3π/2 modulation.

IV.E. Scale Factor Compensation

In the invention, means are provided to adapt the loop controller 10 to operation with a digital-to-analog converter 22 with a "non-adjustable" reference. That is, the digital-to-analog converter 22 need not include an adjustment for scale factor variability. Such variability, often dependent upon temperature, affects the relationship between the analog voltage applied to the phase modulator in 26 and the resultant phase shift between the light waves that counter-propagate within the gyro 14. In the prior art, the conversion factor of the digital ramp value produced at 98 to an analog voltage has required an adjustment in the analog domain in accordance with the scale factor of the phase modulator. In the present invention, one may employ a digital-to-analog converter 22 of greater precision (more bits) with a fixed (non-adjustable) analog reference. This is accomplished by first complementing the most significant bit of the ramp at 112 to convert the value of the ramp from offset binary to two's-complement form. This assures that the ramp is symmetric about zero (i.e. no d.c. component).

The most significant sixteen bits of the 32-bit word describing the ramp are then extracted at 114 and the 16-bit representation is multiplied at 116 by the phase modulator scale factor estimate PMSF. The output of 116 is written to the digital-to-analog converter 22 which is arranged in a two's-complement format.

IV.F. Scale Factor Error Detection

Referring to the loop for determining scale factor error, the CARRY output of the ramp integration 98 is transformed to a ±1 value at 118. Thus, in contrast to the other functions described above, the ±1 value is generated within the gyro processor 32 with a −1 indicating a CARRY bit from the primary integrator 98 and a +1 indicating the absence thereof.

The output of 118 is delayed by 3τ at 120 and then multiplied at 96 by the rate error value from 90. This operation, indicated by FIG. 4 to occur at cycle "7", a parallel operation cycle, affects the replacement of a select or test and branch function by a multiplication step. The output of 96 is integrated at 100 to generate the secondary scale factor error integrator, SINT, that is supplied to the auxiliary processor 34 to generate the phase modulator scale factor PMSF.

As can be seen, the present invention provides a loop controller architecture that enables the performance of numerous useful optional loop controller operations during each loop transit time. This is accomplished by efficiently organizing the generation and updating of numerous variables and parameters to permit the efficient programming of the gyro processor. The invention is quite flexible, offering the possibility of employing numerous modulation and loop dither schemes. By utilizing the teachings of the invention one may realize numerous advantages in terms of error control and accuracy that are not available when employing a loop controller in accordance with the prior art.

While this invention has been illustrated and described with reference to its presently-preferred embodiment, it is not limited thereto. Rather, this invention is limited only insofar as it is defined by the following set of patent claims and includes within its scope all equivalents thereof.

What is claimed is:

1. A loop controller for receiving the output of a fiber optic gyro generated during a loop transit time τ and deriving a plurality of gyro functions in response thereto comprising, in combination:

a) a gyro processor for receiving the output of said gyro;
   b) a field programmable gate array for generating signed values during each loop transit time;
   c) an auxiliary processor for updating predefined parameters; and
   d) said gyro processor being arranged to receive said updated parameters and said values and to generate said gyro functions in response thereto.

2. A loop controller as defined in claim 1 wherein said gyro processor includes means for associating at least one predetermined parameter with a signed value whereby said gyro processor performs the equivalent of a test and branch operation.

3. A loop controller as defined in claim 1 wherein said field programmable gate array includes means for generating a sequence of modulation values.

4. A loop controller as defined in claim 3 further including means for adjusting said sequence of modulation values to achieve, in the alternative, deterministic, random and pseudo-random modulation value sequences.

5. A loop controller as defined in claim 2 further characterized in that:

a) said field programmable gate array includes means for generating a sequence of perturbation correction sign values;
   b) said auxiliary processor includes means for updating a perturbation compensation value; and
   c) said means for associating at least one predetermined parameter with a signed value includes means for multiplying said perturbation compensation value by said perturbation correction sign values.

6. A loop controller as defined in claim 5 further characterized in that said auxiliary processor includes means for updating a gyro output d.c. offset value.

7. A loop controller as defined in claim 2 further characterized in that:

a) said field programmable gate array includes means for generating a sequence of perturbation sign values;
   b) said auxiliary processor includes means for generating a perturbation input value; and
   c) said means for associating of said gyro processor includes means for multiplying said perturbation input value by said perturbation sign values.

8. Apparatus for receiving the output of a fiber optic gyro generated during a loop transit time τ and deriving a plurality of gyro functions in response thereto comprising, in combination:

a) means for receiving the output of said gyro;
   b) means for generating signed values during each loop transit time;
   c) means for updating predefined parameters;
   d) said means for receiving, said means for generating and said means for updating being arranged for parallel operation; and
   e) said means for receiving being arranged to receive said updated parameters and said values and to generate said gyro functions in response thereto.

9. Apparatus as defined in claim 8 wherein said means for receiving further includes means for associating selected predefined parameters and signed values.

10. Apparatus as defined in claim 8 wherein said means for generating includes means for generating a sequence of modulation values.

11. Apparatus as defined in claim 10 further including means for adjusting said sequence of modulation values to achieve, in the alternative, deterministic, random and pseudo-random modulation value sequences.

12. Apparatus as defined in claim 9 further characterized in that:
   a) said means for generating includes means for generating a sequence of perturbation correction sign values;
   b) said means for updating includes means for updating a perturbation compensation value; and
   c) said means for associating comprises means for multiplying said perturbation compensation value by said perturbation correction sign values.

13. Apparatus as defined in claim 12 further characterized in that said means for updating includes means for updating a gyro output d.c. offset value.

14. Apparatus as defined in claim 9 further characterized in that:
   a) said means for generating includes means for generating a sequence of perturbation sign values;
   b) said means for updating includes means for generating a perturbation input value; and
   c) said means for associating includes means for multiplying said perturbation input value by said perturbation sign values.

15. A method for deriving a plurality of gyro functions during a gyro loop transit time comprising the steps of:
   a) receiving the output of said gyro; then
   b) generating signed values during each loop transit time and generating and updating predefined parameters in response to said output in parallel operations; and then
   c) generating said gyro functions as a function of said signed values and updated predefined parameters.

16. A method as defined in claim 15 further including the step of associating at least one predetermined parameter with a signed value to perform the equivalent of a test and branch operation.

17. A method as defined in claim 15 further including the step of generating a sequence of modulation values.

18. A method as defined in claim 17 further including the step of adjusting said sequence of modulation values to achieve, in the alternative, deterministic, random and pseudo-random modulation value sequences.

19. A method as defined in claim 16 further including the steps of:
   a) generating a sequence of perturbation correction sign values; and
   b) updating a perturbation compensation value; and then
   c) multiplying said perturbation compensation value by said perturbation correction sign values.

20. A method as defined in claim 19 further including the step of updating a gyro output d.c. offset value.

21. A method as defined in claim 16 further including the steps of:
   a) generating a sequence of perturbation sign values; and
   b) generating a perturbation input value; and then
   c) multiplying said perturbation input value by said perturbation sign values.

22. A method for deriving a plurality of gyro functions during a gyro loop transit time comprising the steps of:
   a) receiving the output of said gyro; then
   b) processing said output within a loop controller; and
   c) dividing said loop controller into (i) a gyro processor for receiving said gyro output, (ii) a field programmable gate array for generating signed values during each loop transit time and (iii) an auxiliary processor for updating predefined parameters; and
   d) arranging said gyro processor to receive said updated parameters and said values and to generate said gyro functions in response thereto.

23. A method as defined in claim 22 further including the step of associating at least one predetermined parameter with a signed value to perform the equivalent of a test and branch operation within said gyro processor.

24. A method as defined in claim 22 further including the step of generating a sequence of modulation values within said field programmable gate array.

25. A method as defined in claim 24 further including the step of adjusting said sequence of modulation values within said field programmable gate array to achieve, in the alternative, deterministic, random and pseudo-random modulation value sequences.

26. A method as defined in claim 23 further including the steps of:
   a) generating a sequence of perturbation correction sign values by means of said field programmable gate array; and
   b) updating a perturbation compensation value within said auxiliary processor; and then
   c) multiplying said perturbation compensation value by said perturbation correction sign values within said gyro processor.

27. A method as defined in claim 26 further including the step of updating a gyro output d.c. offset value within said auxiliary processor.

28. A method as defined in claim 23 further including the steps of:
   a) generating a sequence of perturbation sign values by means of said field programmable gate array; and
   b) generating a perturbation input value within said auxiliary processor; and then
   c) multiplying said perturbation input value by said perturbation sign values within said gyro processor.

* * * * *